(12) United States Patent
Gu et al.

(10) Patent No.: US 12,340,946 B2
(45) Date of Patent: Jun. 24, 2025

(54) MULTILAYER ELECTRONIC COMPONENT

(71) Applicant: SAMSUNG ELECTRO-MECHANICS CO., LTD., Suwon-si (KR)

(72) Inventors: Sin Il Gu, Suwon-si (KR); Jin Hyung Lim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 298 days.

(21) Appl. No.: 18/106,127

(22) Filed: Feb. 6, 2023

(65) Prior Publication Data

US 2024/0161980 A1 May 16, 2024

(30) Foreign Application Priority Data

Nov. 14, 2022 (KR) .................... 10-2022-0151972

(51) Int. Cl.
*H01G 4/232* (2006.01)
*H01G 4/005* (2006.01)
(Continued)

(52) U.S. Cl.
CPC .......... *H01G 4/2325* (2013.01); *H01G 4/005* (2013.01); *H01G 4/248* (2013.01); *H01G 4/30* (2013.01)

(58) Field of Classification Search
CPC ........ H01G 4/30; H01G 4/2325; H01G 4/005; H01G 4/248
See application file for complete search history.

(56) References Cited

U.S. PATENT DOCUMENTS

2006/0039097 A1* 2/2006 Satou ................ H01G 4/30
361/303
2008/0251285 A1* 10/2008 Sato .................. H05K 1/0231
361/313
(Continued)

FOREIGN PATENT DOCUMENTS

JP         3706503 B2   10/2005
JP       2012-28593 A    2/2012
(Continued)

*Primary Examiner* — Timothy J. Dole
*Assistant Examiner* — Kaemon Eli Watada
(74) *Attorney, Agent, or Firm* — Morgan Lewis & Bockius LLP

(57) ABSTRACT

A multilayer electronic component including: a body including a capacitance formation portion, cover portions disposed on surfaces on the capacitance formation portion opposing each other in one direction, and margin portions disposed on surfaces of the capacitance formation portion opposing each other in another direction; a first external electrode; a second external electrode, and the cover portions include a first-first buffer layer connected to the first external electrode and a first-second buffer layer connected to the second external electrode, and the margin portions include a second-first buffer layer connected to the first external electrode and a second-second buffer layer connected to the second external electrode, and the first-first buffer layer and the second-first buffer layer are connected to each other, and the first-second buffer layer and the second-second buffer layer are connected to each other.

18 Claims, 10 Drawing Sheets

(51) Int. Cl.
*H01G 4/248* (2006.01)
*H01G 4/30* (2006.01)

(56) References Cited

U.S. PATENT DOCUMENTS

| | | | | |
|---|---|---|---|---|
| 2012/0019100 A1* | 1/2012 | Iwanaga | ................ | H01G 4/012 336/200 |
| 2013/0241361 A1* | 9/2013 | Lee | ........................ | H01G 4/012 336/200 |
| 2015/0114700 A1* | 4/2015 | Park | ........................ | H01G 4/012 361/301.4 |
| 2015/0255215 A1* | 9/2015 | Shirakawa | ............. | H01G 4/232 361/301.3 |
| 2016/0276104 A1 | 9/2016 | Nishisaka et al. | | |
| 2017/0278634 A1 | 9/2017 | Kato | | |
| 2021/0350985 A1* | 11/2021 | Kim | ........................ | H01G 4/232 |

FOREIGN PATENT DOCUMENTS

| | | | |
|---|---|---|---|
| JP | 2016-178219 A | 10/2016 | |
| JP | 2017-175037 A | 9/2017 | |

\* cited by examiner

MULTILAYER ELECTRONIC COMPONENT

CROSS-REFERENCE TO RELATED APPLICATION(S)

This application claims benefit of priority to Korean Patent Application No. 10-2022-0151972 filed on Nov. 14, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser mounted on a printed circuit board of various electronic products such as imaging devices including a liquid crystal display device (LCD) and a plasma display device panel (PDP), computers, smartphones, and serves to charge or discharge electricity.

At present, with the miniaturization of electronic devices, miniaturization and high integration of multilayer electronic components are also greatly required. In particular, for multilayer ceramic capacitors (MLCC) as a general-purpose electronic component, various attempts have been made to make its layer thinner and higher in capacitance.

In order to improve the capacitance of the multilayer ceramic capacitor, attempts have been made to atomize the dielectric materials or the materials of the internal electrode, or to form thin dielectric layers or internal electrode. In this case, the effect of improving the capacitance can be obtained, but it is difficult to maintain the dispersion of the thickness of the dielectric layers or the thickness of the internal electrode constantly, which may make it difficult to secure the withstand voltage characteristics.

In order to solve this problem, it is necessary to maximize the proportion of the total components that contributes to the formation of the capacitance of the capacitor, and in order to realize this, it is possible to consider minimizing the proportion of the external electrode in the total components or minimizing the margin design of the internal electrode. However, if the proportion of the external electrode in the overall components or the margin design of the internal electrode is minimized, there is a problem in that the moisture resistance reliability of the entire components may be degraded.

Therefore, it is necessary to develop a structure that can improve capacitance and prevent a decrease in moisture resistance reliability without significantly affecting the withstand voltage characteristics of multilayer electronic components.

SUMMARY

One of the several objects of the present disclosure is to improve the capacitance per unit volume of the multilayer electronic component.

One of several objects of the present disclosure is to mitigate the deterioration of moisture resistance reliability that may occur when the proportion of the external electrode in the total components is minimized in order to improve the capacitance per unit volume of the multilayer electronic component.

One of several objects of the present disclosure is to alleviate the phenomenon in which the adhesion strength of the external electrode and the body decreases when the proportion of the external electrode in the total components is minimized in order to improve the capacitance per unit volume of the multilayer electronic component.

However, the objects of the present disclosure are not limited to the above-described contents, and this will become clearer to understand during the process of describing specific embodiments of the present disclosure.

According to an aspect of the present disclosure, the multilayer electronic component includes a body comprising first and second surfaces opposing each other in a first direction, third and fourth surfaces connected to the first and second surfaces and opposing each other in a second direction, fifth and sixth surfaces connected to the first to fourth surfaces and opposing each other in a third direction, a capacitance formation portion in which the dielectric layers and the internal electrodes are alternately disposed in the first direction, cover portions disposed on surfaces of the capacitance formation portion opposing each other in the first direction, and margin portions disposed on surfaces of the capacitance formation portion opposing each other in the third direction; a first external electrode comprising a first connection portion disposed on the third surface, and a first band portion disposed to extend from the first connection portion to a portion of the first surface; and a second external electrode comprising a second connection portion disposed on the fourth surface, a second band portion disposed to extend from the second connection portion to a portion of the first surface; in which the cover portions include a first-first buffer layer connected to the first external electrode and a first-second buffer layer connected to the second external electrode, and the margin portions include a second-first buffer layer connected to the first external electrode and a second-second buffer layer connected to the second external electrode, in which the first-first buffer layer and the second-first buffer layer are connected to each other, and the first-second buffer layer and the second-second buffer layer are connected to each other.

One of the many effects of the present disclosure is to improve the capacitance per unit volume of the multilayer electronic component.

One of the many effects of the present disclosure is to improve the capacitance per unit volume of the multilayer electronic component while improving the moisture resistance reliability.

One of the various effects of the present disclosure is to improve the capacitance per unit volume of the multilayer electronic component while improving the adhesion strength of the external electrode.

However, various and beneficial advantages and effects of the present disclosure are not limited to the above-described contents, and it will be clearer to understand during the process of describing specific embodiments of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
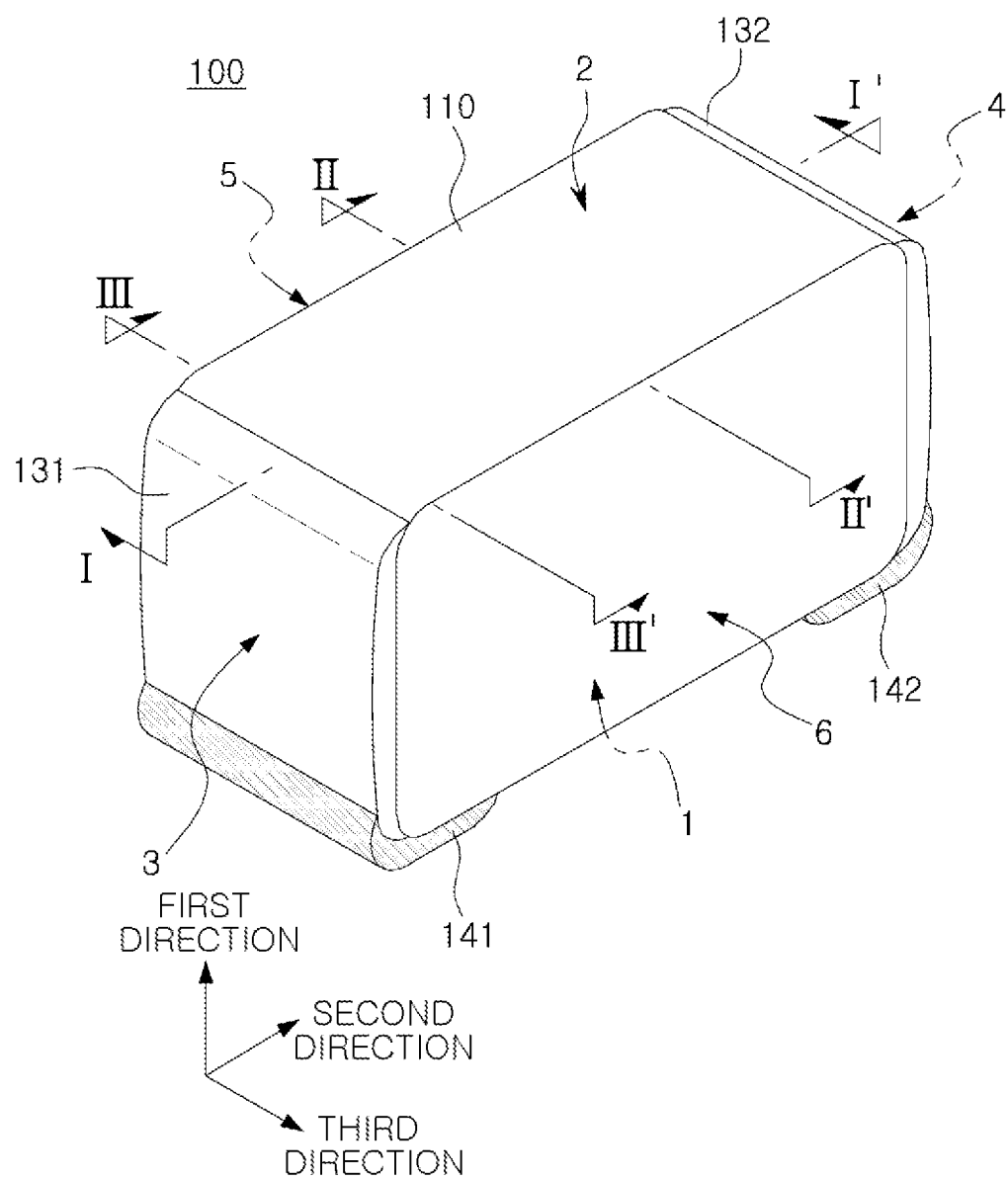
FIG. 1 is a perspective view of a multilayer electronic component according to an embodiment of the present disclosure.

Hereinafter, with reference to specific embodiments and accompanied drawings, the embodiments of the present disclosure will be described. However, the embodiments of the present disclosure may be modified into various other forms, and the scope of the present disclosure is not limited to the embodiments described below. In addition, the embodiments of the present disclosure are provided to more fully describe the present disclosure to those skilled in the art. Therefore, the shape and size of the elements in the drawings may be exaggerated for a clearer explanation, and the elements represented by the same reference marks on the drawings are the same elements.

In order to clearly describe the present disclosure in the drawings, parts that are not related to the description are omitted, and the size and thickness of each formation shown in the drawings are arbitrarily shown for the convenience of the description, so that the present disclosure is not necessarily limited to the shown configuration. In addition, components with the same function within the scope of the same idea are described using the same reference marks. Further, when a part "includes" an element in the entire description, it means that it may further include the other element rather than excluding other elements unless specifically stated to the contrary.

In the figure, a first direction may be defined as a direction in which first and second internal electrodes are alternately disposed with dielectric layers between them or a thickness T direction, and among a second direction and a third direction which are a perpendicular direction to the first direction, the second direction may be defined as a length L direction, and the third direction as a width W direction.

FIG. 1 is a perspective view of a multilayer electronic component according to an embodiment of the present disclosure.

Figure 2:
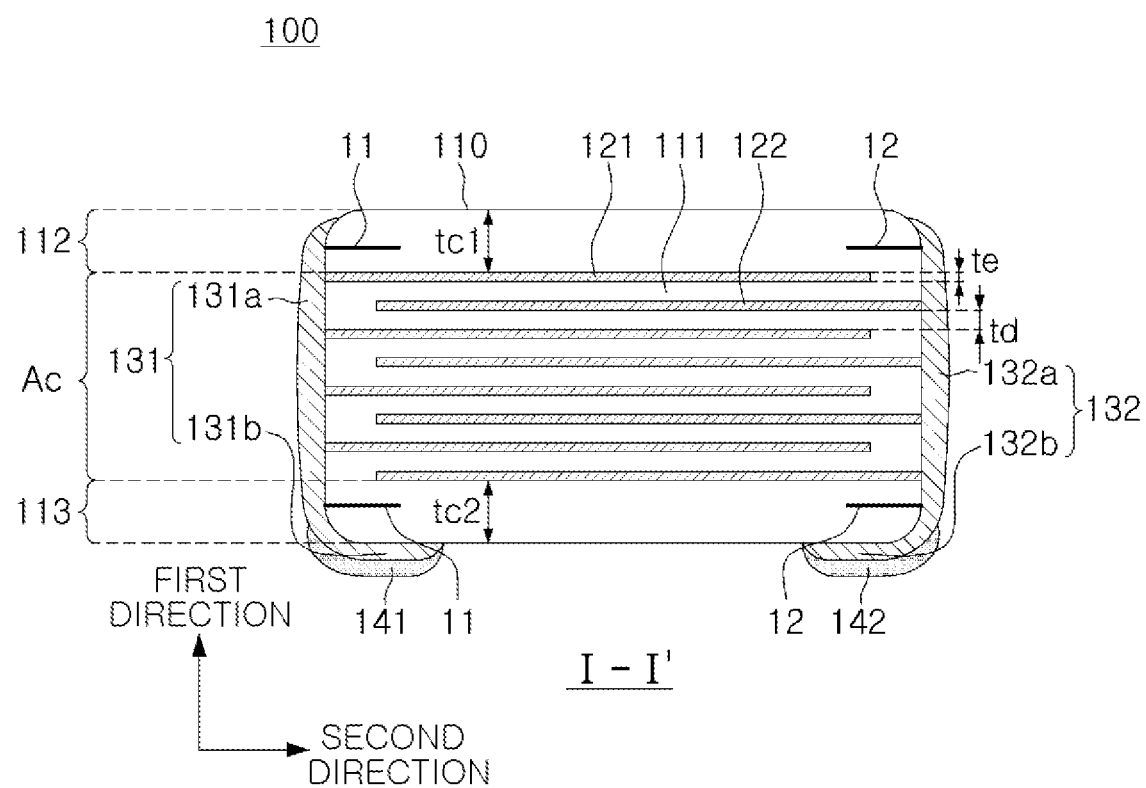
FIG. 2 is a cross section taken along line I-I' of FIG. 1.
Figure 3:
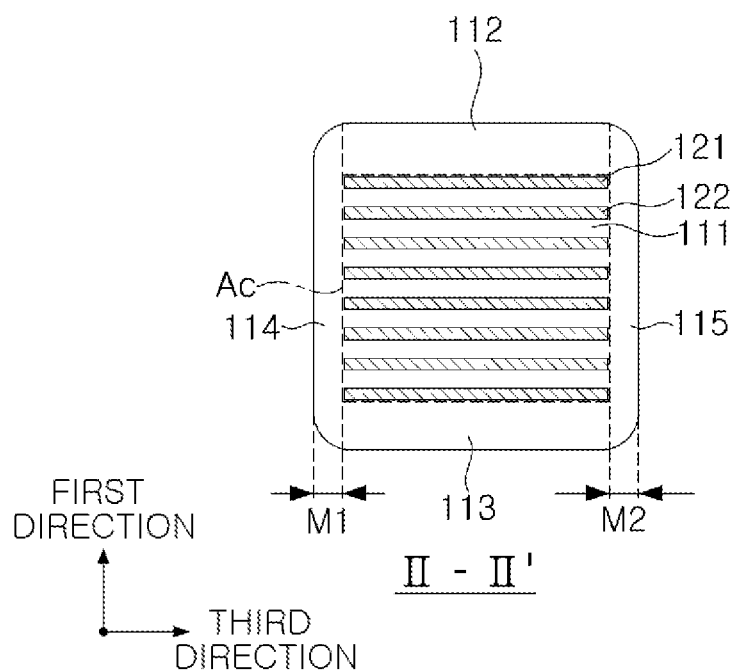
FIG. 3 is a cross section taken along line II-II' of FIG. 1.
Figure 4:
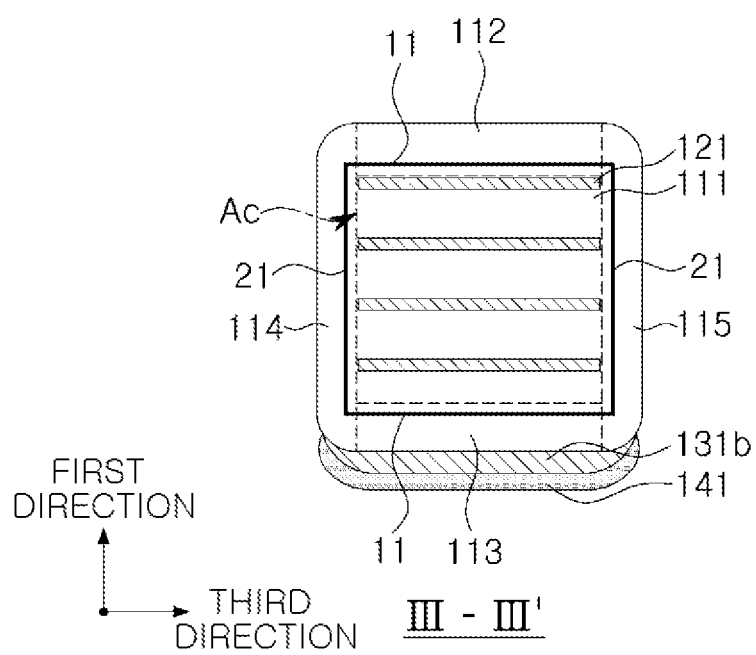
FIG. 4 is a cross section taken along line III-III' of FIG. 1.

FIG. 2 is a cross section taken along line I-I' of FIG. 1.
FIG. 3 is a cross section taken along line II-II' of FIG. 1.
FIG. 4 is a cross section taken along line III-III' of FIG. 1.

Figure 5:
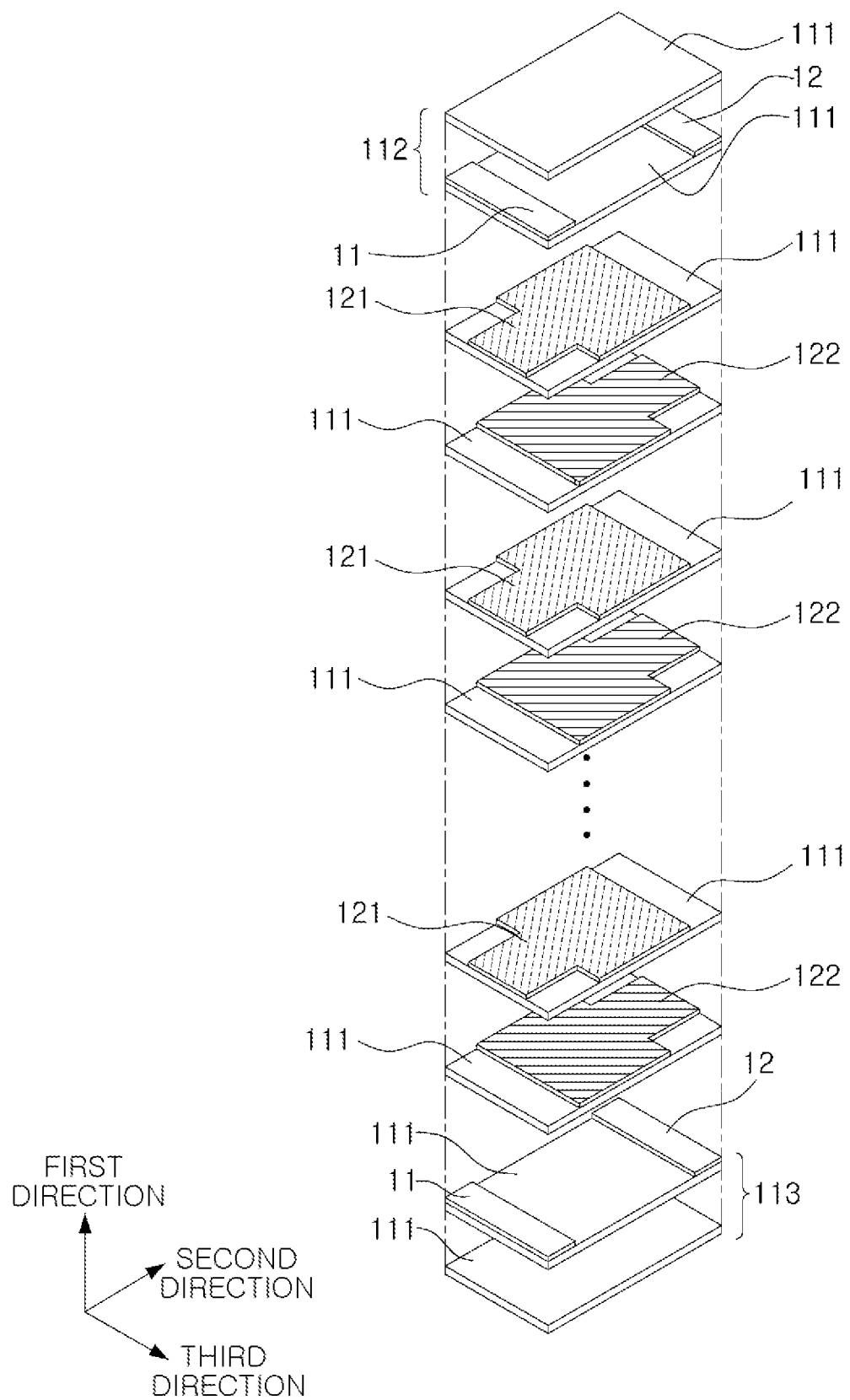
FIG. 5 is an exploded perspective view illustrating a disassembled structure in which internal electrodes, dielectric layers, and cover portions of the multilayer electronic component are disposed according to an embodiment of the present disclosure.

FIG. 5 is an exploded perspective view illustrating a disassembled structure in which internal electrodes, dielectric layers, and cover portions of the multilayer electronic component are disposed according to an embodiment of the present disclosure.

Figure 6:
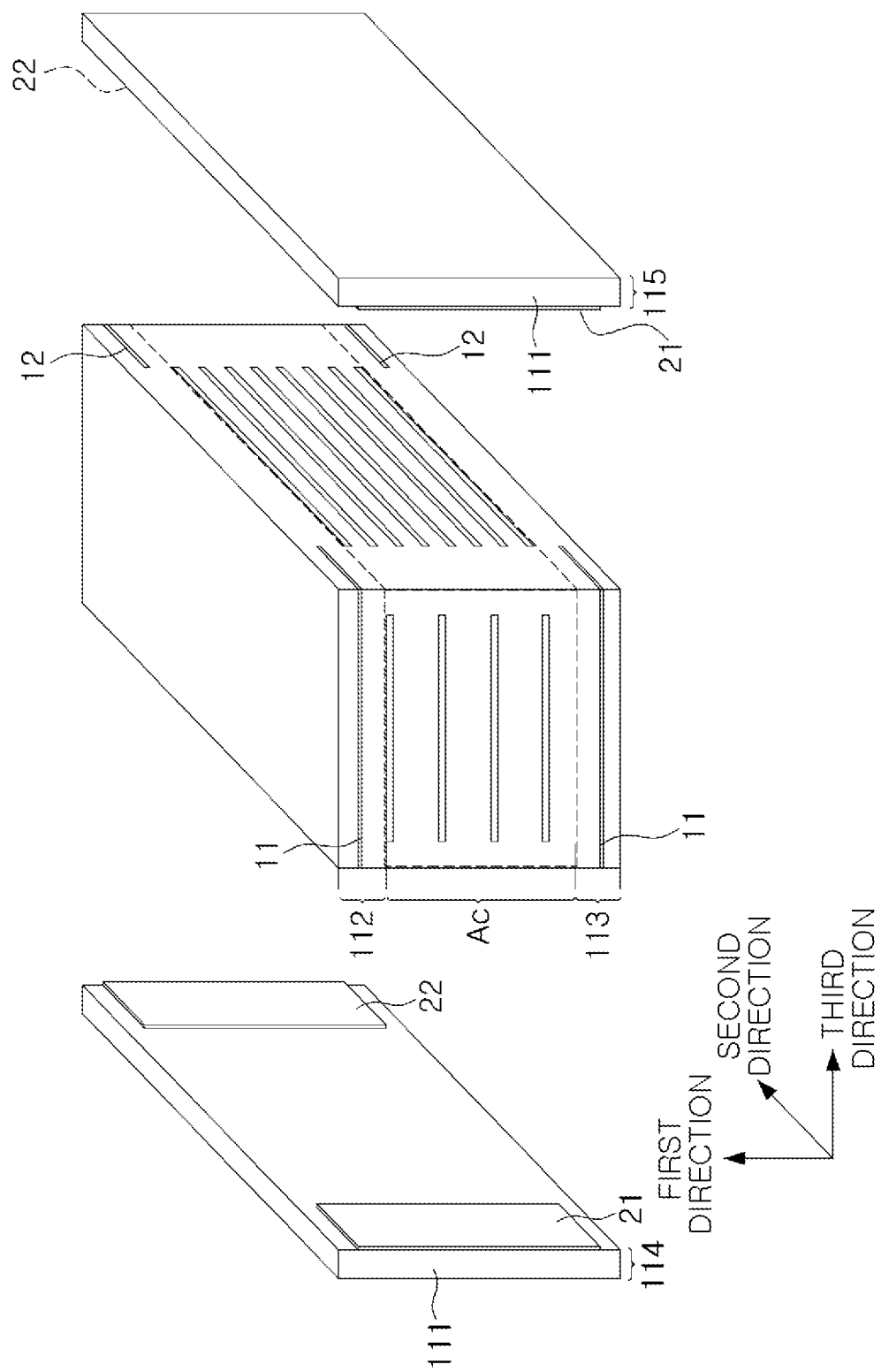
FIG. 6 is an exploded perspective view illustrating a disassembled structure of a body in which a capacitance formation portion, cover portions, and margin portions of the multilayer electronic component are disposed according to an embodiment of the present disclosure.

FIG. 6 is an exploded perspective view illustrating a disassembled structure of a body in which a capacitance formation portion, cover portions, and margin portions of the multilayer electronic component are disposed according to an embodiment of the present disclosure.

Figure 7:
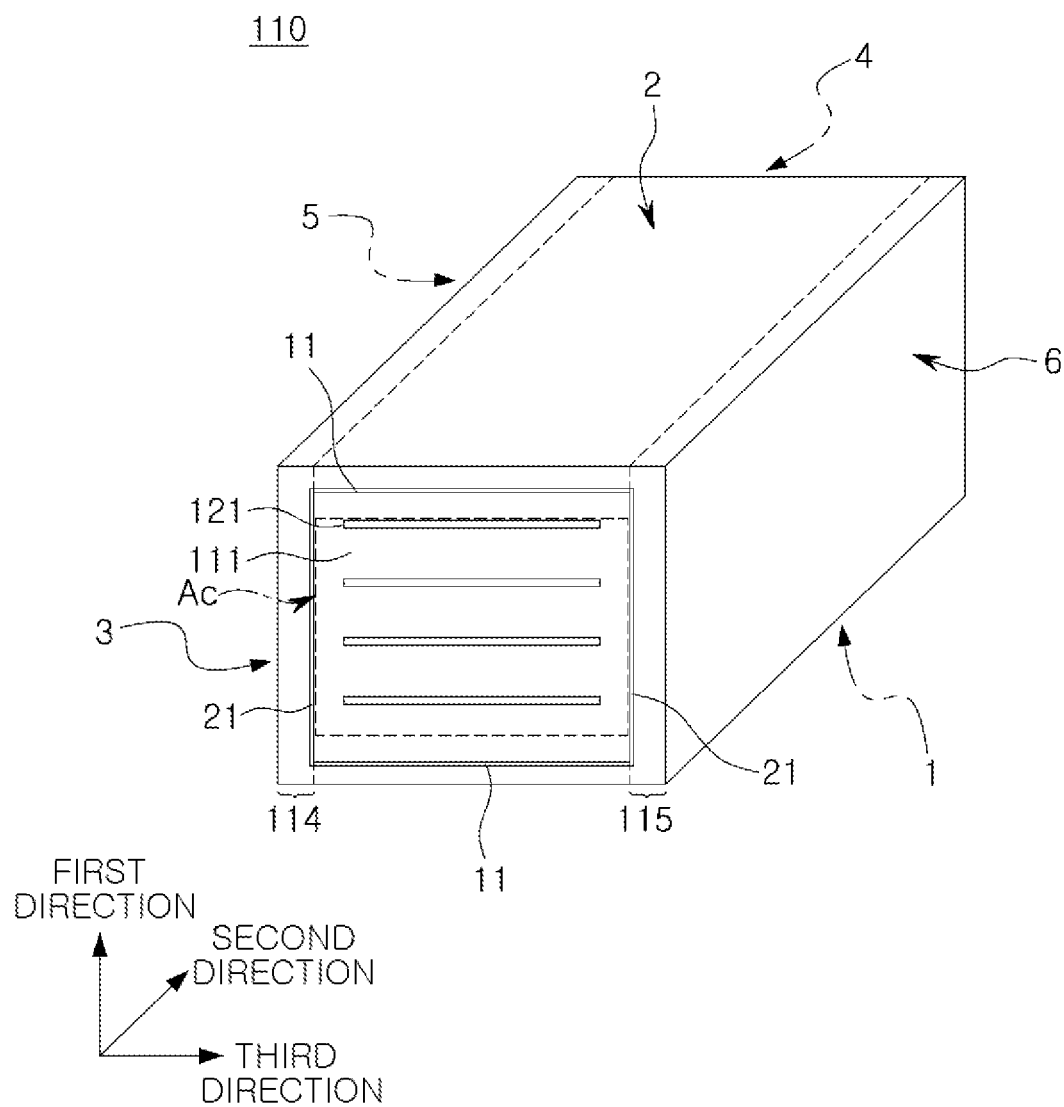
FIG. 7 is a perspective view illustrating schematically the body of the multilayer electronic component according to an embodiment of the present disclosure.

FIG. 7 is a perspective view illustrating schematically the body of the multilayer electronic component according to an embodiment of the present disclosure.

Figure 8A:
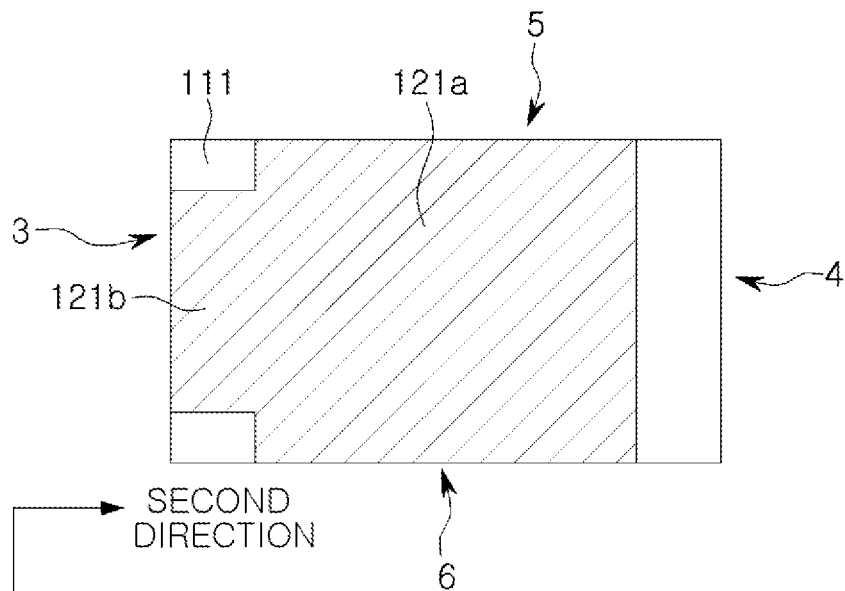
FIG. 8A is a plan view illustrating the shape of a first internal electrode according to an embodiment of the present disclosure.
Figure 8B:
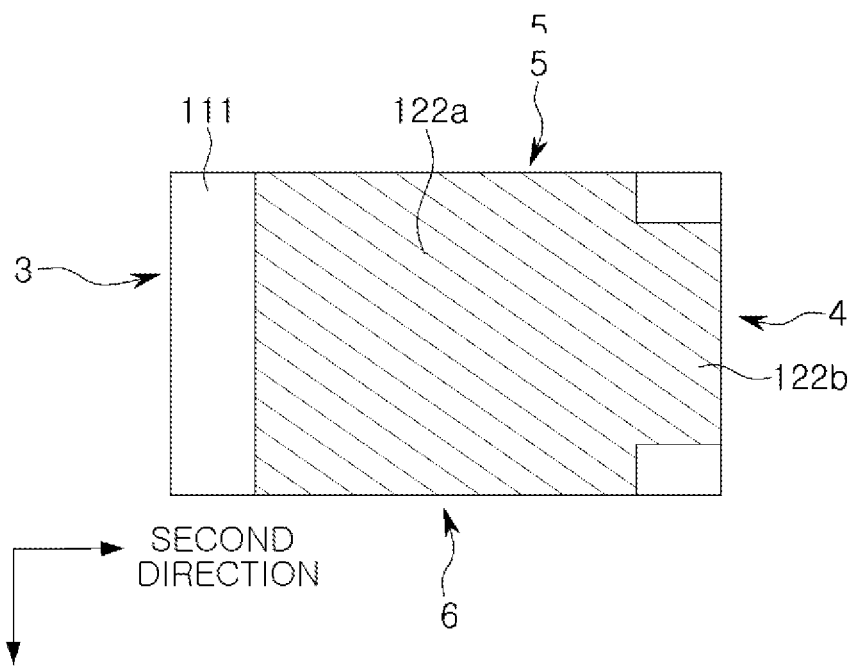
FIG. 8B is a plan view illustrating the shape of a second internal electrode according to an embodiment of the present disclosure.

FIG. 8A is a plan view illustrating the shape of a first internal electrode according to an embodiment of the present disclosure, and FIG. 8B is a plan view illustrating the shape of a second internal electrode according to an embodiment of the present disclosure.

Hereinafter, with reference to FIGS. 1 to 9B, the multilayer electronic component 100 according to an embodiment of the present disclosure will be described in detail.

The multilayer electronic component 100 according to an embodiment of the present disclosure includes a body comprising first and second surfaces 1 and 2 opposing each other in a first direction, third and fourth surfaces 3 and 4 connected to the first and second surfaces 1 and 2 and opposing each other in a second direction, fifth and sixth surfaces 5 and 6 connected to the first to fourth surfaces 1, 2, 3 and 4 and opposing each other in a third direction, a capacitance formation portion Ac in which the dielectric layers 111 and the internal electrodes 121 and 122 are alternately disposed in the first direction, cover portions 112 and 113 disposed on a surface and another surface of the first direction of the capacitance formation portion Ac, and margin portions 114 and 115 disposed on a surface and another surface of the third direction of the capacitance formation portion Ac; a first external electrode 131 comprising a first connection portion 131a disposed on the third surface, and a first band portion 131b disposed to extend from the first connection portion 131a to a portion of the first surface 1; and a second external electrode 132 comprising a second connection portion 132a disposed on the fourth surface 4, a second band portion 132b disposed to extend from the second connection portion 132a to a portion of the first surface 1; in which the cover portions 112 and 113 include a first-first buffer layer 11 connected to the first external electrode 131 and a first-second buffer layer 12 connected to the second external electrode 132, and the margin portions 114 and 115 include a second-first buffer layer 21 connected to the first external electrode 131 and a second-second buffer layer 22 connected to the second external electrode 132, in which the first-first buffer layer 11 and the second-first buffer layer 21 are connected to each other, and the first-second buffer layer 12 and the second-second buffer layer 22 are connected to each other.

The body 110 is stacked alternately with the dielectric layers 111 and the internal electrodes 121 and 122 in the first direction.

Although there is no particular limitation on a specific shape of the body 110, as shown, the body 110 may be made of a cube shape or a similar shape. Due to the contraction of the ceramic powder contained in the body 110 during the sintering process, the body 110 may not have a hexahedral shape with complete straight lines, but a substantial hexahedral shape.

The body 110 may include first and second surfaces 1 and 2 opposing each other in a first direction, third and fourth surfaces 3 and 4 connected to the first and second surfaces 1 and 2 opposing each other in a second direction, and fifth and sixth surfaces 5 and 6 connected to the first and second surfaces 1 and 2 and connected to the third and fourth surfaces 3 and 4 and opposing each other in a third direction.

The plurality of first dielectric layers 111 forming the body 110 are in a calcined state, and the border between the adjacent dielectric layers 111 may be integrated so that it is difficult to check unless using a scanning electron microscope (SEM).

According to an embodiment of the present disclosure, the raw materials forming the dielectric layers 111 are not particularly limited as long as sufficient capacitance can be obtained. For example, barium titanate materials, lead composite perovskite materials or titanium strontium-based materials may be used. The barium titanate materials may include $BaTiO_3$ based ceramic powder particles. $BaTiO_3$, and $(Ba_{1-x}Ca_x) TiO_3$ ($0<x<1$), $Ba(Ti_{1-y}Ca_y) O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$), which are $BaTiO_3$ with partially employed Ca(calcium) and Zr(zirconium), etc., may be used as examples of the ceramic powder particles.

In addition, the raw materials for forming the first dielectric layers 111 may be powder particles such as barium titanate ($BaTiO_3$) to which various ceramic additives, organic solvents, binders, dispersants, and etc., are added according to the object of the present disclosure.

On the other hand, the average thickness td of the dielectric layers 111 does not need to be particularly limited. For example, the average thickness td of the dielectric layers 111 may be greater than 0.2 μm and less than 2 μm.

However, in general, when the dielectric layers are thinly formed with a thickness less than 0.6 μm, or in particular when the thickness of the dielectric layers is 0.35 μm or less, the reliability of the multilayer electronic component 100 may be further reduced.

In the case of the multilayer electronic component 100 according to an embodiment of the present disclosure, the reliability of the multilayer electronic component 100 can be secured even when the average thickness td of the dielectric layers 111 is 0.35 μm or less. That is, when the average thickness td of the dielectric layers 111 is 0.35 μm or less, the reliability improvement effect according to the present disclosure may be more prominent.

The average thickness td of the dielectric layers 111 may mean the average thickness td of the dielectric layers 111 disposed between the first and second internal electrodes 121 and 122.

The average thickness td of the dielectric layers 111 may be measured by scanning the images of the cross-sections of the length and thickness directions (L-T) of the body 110 with a scanning electron microscope (SEM) at 10,000 magnifications. More specifically, it may be an average value measuring the thickness at 30 equidistant interval points in the length direction in order to measure one dielectric layer 111 from a scanned image. The 30 equidistant interval points may be designated in the capacitance formation portion Ac. In addition, if the average value measurement is extended to 10 dielectric layers to measure the average value, the average thickness of the dielectric layers may be further generalized. Other methods and/or tools appreciated by one of ordinary skill in the art, even if not described in the present disclosure, may also be used.

The body 110 may include a capacitance formation portion Ac in which the dielectric layers 111 and the internal electrodes 121 and 122 are alternately disposed in the first direction. The capacitance formation portion Ac is a portion contributing to the formation of capacitance of the capacitor, and may be formed by alternately stacking a plurality of first and second internal electrodes 121 and 122 between the dielectric layers 111.

There is no particular limitation on a specific shape of the capacitance formation portion Ac, but like the body 110, it may be made of a hexahedral shape or a shape related thereto. In the process of stacking and pressing of the dielectric layers 111 and the internal electrodes 121 and 122, due to the difference of the contraction behavior caused by the difference of the materials included in the dielectric layers and internal electrodes, the capacitance formation portion Ac may not have a hexahedral shape with complete straight lines, but a substantial hexahedral shape.

In order to protect the capacitance formation portion Ac from external environments such as external moisture infiltration and impact, cover portions 112 and 113 may be disposed on a surface and another surface of the first direction of the capacitance formation portion Ac, and margin portions 114 and 115 may be disposed on a surface and another surface of the third direction of the capacitance formation portion Ac.

Referring to FIG. 5, the cover portions 112 and 113 include an upper cover portion 112 disposed on a surface of the first direction of the capacitance formation portion Ac, and a lower cover portion 113 disposed on another surface of the first direction of the capacitance formation portion Ac.

The upper cover portion 112 and the lower cover portion 113 may be formed by stacking a single dielectric layer or two or more dielectric layers on the upper and lower surfaces of the capacitance formation portion Ac in the thickness direction, respectively, and basically serve to prevent damage to the internal electrodes by physical or chemical stress.

The upper cover portion 112 and the lower cover portion 113 do not include an internal electrode and may include the same materials as the dielectric layers 111.

That is, the upper cover portion 112 and the lower cover portion 113 may include ceramic materials, for example, a barium titanate ($BaTiO_3$) based ceramic materials.

On the other hand, the average thicknesses tc1 and tc2 of the cover portions 112 and 113 do not need to be particularly limited. However, in order to more easily achieve miniaturization and higher capacitance of the multilayer electronic component, the average thicknesses tc1 and tc2 of the cover portions 112 and 113 may be 15 μm or less. In the case of the multilayer electronic component 100 according to an embodiment of the present disclosure, the reliability of the multilayer electronic component 100 can be secured even when the average thicknesses tc1 and tc2 of the cover portions are 15 μm or less.

The average thicknesses tc1 and tc2 of the cover portions 112 and 113 may mean the size of the first direction, and the average value of the size of the first direction of the cover portions 112 and 113 measured at five equidistant interval points from the upper or lower parts of the capacitance formation portion Ac.

Referring to FIG. 6, margin portions 114 and 115 may be disposed on a surface or another surface of the third direction of the capacitance formation portion Ac.

The margin portions 114 and 115 may include a margin portion 114 disposed adjacent to the fifth surface 5 of the body 110 and a margin portion 115 adjacent to the sixth surface 6.

As shown in FIGS. 3 and 4, the margin portions 114 and 115 may mean an area between the end-surfaces of the first and second internal electrodes 121 and 122 and the border surface of the body 110, based on a cross-section cut in the width-thickness(W-T) directions of the body 110.

The margin portions 114 and 115 may basically serve to prevent damage to the internal electrodes by physical or chemical stress.

The margin portions 114 and 115 may be formed with the internal electrodes formed by applying a conductive paste on the ceramic green sheet except the place where the margin portions are formed.

In addition, in order to suppress an offset by the internal electrodes 121 and 122, the internal electrodes 121 and 122 are cut after stacking, to be exposed to the fifth and sixth surfaces 5 and 6 of the body, and then a single dielectric layer or two or more dielectric layers may be stacked in the third direction (the width direction) on both lateral surfaces of the capacitance formation portion Ac.

On the other hand, the average widths M1 and M2 of the margin portions 114 and 115 do not need to be particularly limited. However, in order to more easily achieve miniaturization and higher capacitance of the multilayer electronic component, the average widths M1 and M2 of the margin portions 114 and 115 may be 15 μm or less. In the case of the multilayer electronic component 100 according to an embodiment of the present disclosure, the reliability of the multilayer electronic component 100 can be secured even when the average widths M1 and M2 of the margin portions 114 and 115 is 15 μm or less.

The average widths M1 and M2 of the margin portions 114 and 115 may mean the average size of the third direction of the margin portions 114 and 115, and may be an average value of the size of the third direction of the margin portions 114 and 115 measured at five equidistant interval points from a lateral surface of the capacitance formation portion Ac.

The internal electrodes 121 and 122 may be alternately disposed in the first direction with the dielectric layers 111.

The internal electrodes 121 and 122 may include first and second internal electrodes 121 and 122. The first and second internal electrodes 121 and 122 are alternately disposed to oppose each other in between with the dielectric layers 111 constituting the body 110, and may be connected to the third and fourth surfaces 3 and 4 of the body 110, respectively. Specifically, one end of the first internal electrode 121 may be connected to the third surface, and one end of the second internal electrode 122 may be connected to the fourth surface.

The first internal electrode 121 is spaced apart from the fourth surface 4 and exposed through the third surface 3, and the second internal electrode 122 is spaced apart from the third surface 3 and may be exposed through the fourth surface 4. The first external electrode 131 is disposed on the third surface 3 of the body to be connected to the first internal electrode 121, and the second external electrode 132 is disposed on the fourth surface 4 of the body to be connected to the second internal electrode 122.

That is to say, the first internal electrode 121 is not connected to the second external electrode 132 but is connected to the first external electrode 131, and the second internal electrode 122 is not connected to the first external electrode 131 and is connected to the second external electrode 132. Therefore, the first internal electrode 121 may be formed at a predetermined distance apart from the fourth surface 4, and the second internal electrode 122 may be formed at a predetermined distance apart from the third surface 3.

At this time, the first and second internal electrodes 121 and 122 may be electrically separated from each other by the dielectric layers 111 disposed in the middle.

The body 110 may be formed by alternately stacking a ceramic green sheet printed with the first internal electrode 121 and a ceramic green sheet printed with the second internal electrode 122, and then formed by sintering.

The materials forming the internal electrodes 121 and 122 are not particularly limited, and materials having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti) and alloys thereof.

In addition, the internal electrodes 121 and 122 may be formed with a conductive paste for internal electrodes containing one or more of nickel (Ni), copper (Cu), palladium (Pd), silver (Ag), gold (Au), platinum (Pt), tin (Sn), tungsten (W), titanium (Ti) and alloys thereof, printed on a ceramic green sheet. For the printing method of the conductive paste for the internal electrode, a screen printing method or a gravure printing method may be used, and the present disclosure is not limited thereto.

addition, the average thickness te of the internal electrodes 121 and 122 does not need to be particularly limited. For example, the average thickness te of the internal electrodes 121 and 122 may be greater than 0.2 μm and less than 2 μm.

However, in general, when the internal electrodes are thinly formed with a thickness less than 0.6 μm, especially when the thickness of the internal electrodes is 0.35 μm or less, the reliability of the multilayer electronic component 100 may be more problematic.

In the case of the multilayer electronic component 100 according to an embodiment of the present disclosure, the reliability can be improved even when the average thickness te of the internal electrodes 121 and 122 is 0.35 μm or less. Therefore, when the thickness of the internal electrodes 121 and 122 is 0.35 μm or less on average, the effect according to the present disclosure may be more prominent, and miniaturization and higher capacitance of the multilayer electronic component can be more easily achieved.

The average thickness te of the internal electrodes 121 and 122 may mean the average thickness te of the internal electrodes 121 and 122. The average thickness te of the internal electrodes 121 and 122 may be measured by scanning the images of the cross-sections of the length and thickness directions (L-T) of the body 110 with a scanning electron microscope (SEM) at 10,000 magnifications. More specifically, the average value can be measured by measuring the thickness at 30 equidistant interval points in the length direction in order to measure one internal electrode from a scanned image. The 30 equidistant interval points may be designated in the capacitance formation portion Ac. In addition, if the average value measurement is extended to 10 internal electrodes to measure the average value, the average thickness of the internal electrodes may be further generalized. Other methods and/or tools appreciated by one of ordinary skill in the art, even if not described in the present disclosure, may also be used.

The external electrodes 131 and 132 are disposed on the third surface 3 and fourth surface 4 of the body 110. The external electrodes 131 and 132 are disposed on the third and fourth surfaces 3 and 4 of the body 110, respectively, and may include the first and second external electrodes 131 and 132 connected to the first and second internal electrodes 121 and 122 respectively.

In this embodiment, the multilayer electronic component 100 describes a structure comprising two external electrodes 131 and 132, but the number or shape of the external electrodes 131 and 132 may be changed according to the form of the internal electrodes 121 and 122 or other purposes.

Referring to FIG. 1 according to an embodiment of the present disclosure, the first external electrode 131 includes a first connection portion 131a disposed on the third surface 3, and a first band portion 131b disposed to extend from the first connection portion 131a to a portion of the first surface 1, and the second external electrode includes a second connection portion 132a disposed on the fourth surface 4, and a second band portion 132b disposed to extend from the second connection portion 132a to a portion of the first surface 1. Accordingly, the proportion of the external electrodes 131 and 132 in the total volume can be reduced, thereby improving the capacitance per unit volume of the multilayer electronic component 100.

In addition to an embodiment of the present disclosure, there may be various methods for reducing the proportion of the external electrodes 131 and 132 in the total volume of the multilayer electronic component 100. For example, the external electrodes 131 and 132 may not be disposed on the second surface 2, or the external electrodes 131 and 132 may not be disposed on the fifth and sixth surfaces 5 and 6.

When the proportion of the external electrodes 131 and 132 is minimized in the multilayer electronic component 100, the area of the body 110 not covered by the external electrodes 131 and 132 may increase and be vulnerable to external moisture penetration. In particular, when external moisture penetrates into the capacitance formation portion Ac, it may have a fatal effect on the function of the multilayer electronic component 100. In addition, when the proportion of the external electrodes 131 and 132 in the multilayer electronic component 100 is minimized, the area in contact between the body 110 and the external electrodes 131 and 132 is reduced, and the adhesion strength of the external electrodes 131 and 132 may be reduced. The decrease in the adhesion strength of the external electrodes 131 and 132 may cause delamination of the external electrodes 131 and 132 from the body 110, and the gap caused by the delamination may be another factor that reduces the moisture resistance reliability of the multilayer electronic component 100.

Accordingly, referring to FIGS. 2, 4, 5 and 7 according to an embodiment of the present disclosure, the cover portions 112 and 113 include a first-first buffer layer 11 connected to the first external electrode 131 and a first-second buffer layer 12 connected to the second external electrode 132, and the margin portions 114 and 115 include a second-first buffer layer 21 connected to the first external electrode 131 and a second-second buffer layer 22 connected to the second external electrode 132, wherein the first-first buffer layer 11 and the second-first buffer layer 21 are connected to each other, and the first-second buffer layer 12 and the second-second buffer layer 22 are connected to each other.

Referring to FIG. 2, the cover portions 112 and 113 may include a first-first buffer layer 11 and a first-second buffer layer 12, and the first-first buffer layer 11 is connected to the first external electrode 131, and the first-second buffer layer 12 connected to the second external electrode 132. When the external electrodes 131 and 132 are formed by applying a conductive paste and then sintering them, the parts where the external electrodes 131 and 132 get in touch with the cover portions 112 and 113 may be thinner than other parts due to the fluidity and sintering shrinkage of the paste. Therefore, the parts where the external electrodes 131 and 132 and the cover portions 112 and 113 get in touch with may be the main path for external moisture infiltration.

According to an embodiment of the present disclosure, as the cover portions 112 and 113 include a first-first buffer layer 11 connected to the first external electrode 131 and a first-second buffer layer 12 connected to the second external electrode 132, the metal area that gets in contact with the external electrodes 131 and 132 is increased and therefore it not only improves the adhesive strength of the external electrodes 131 and 132 but also blocks the main infiltration path of the external moisture, absorbs the infiltrated moisture, and suppresses that the moisture reaches the capacitance formation portion Ac. Accordingly, the adhesion strength and moisture resistance reliability of the external electrodes 131 and 132 of the multilayer electronic component 100 can be improved.

Referring to FIG. 4, the margin portions 114 and 115 include a second-first buffer layer 21 connected to the first external electrode 131 and a second-second buffer layer 22 connected to the second external electrode 132. Accordingly, by increasing the area of the metal component in contact with the external electrodes 131 and 132 together with the first-first and first-second buffer layers 11 and 12 included in the above-described cover portions 112 and 113, it not only improves the adhesion strength of the external electrodes 131 and 132, but also blocks the main infiltration path of the external moisture, absorbs the infiltrated moisture, and suppresses that the moisture reaches the capacitance formation portion Ac. Accordingly, the adhesion strength and moisture resistance reliability of the external electrodes 131 and 132 of the multilayer electronic component 100 can be further improved.

Referring to FIG. 4, the first-first buffer layer 11 and the second-first buffer layer 21 are connected to each other, and the first-second buffer layer 12 and the second-second buffer layers 22 are connected to each other. Accordingly, the movement of the external moisture that can penetrate into the area where the cover portions 112 and 113 and the margin portions 114 and 115 are in contact with the external electrodes 131 and 132 or into the area where the microstructure is vulnerable due to the sintering shrinkage of the body 110 can be more significantly blocked, and the effect of protecting the capacitance formation portion Ac from the penetration of external moisture can be more prominent.

The fact that the first-first buffer layer 11 and the second-first buffer layer 21 are interconnected, and the first-second buffer layer 12 and the second-second buffer layer 22 are interconnected may mean that the first-first buffer layer 11 and the second-first buffer layer 21 are integrally connected, and the first-second buffer layer 12 and the second-second buffer layer 22 are integrally connected. That is to say, the first-first buffer layer 11 and the second-first buffer layer 21 may be in a connected shape as a square shape on a cross-section of the first and third directions where the second internal electrode 122 of the multilayer electronic component 100 is not present, and the first-second buffer layer 12 and the second-second buffer layer 22 may be in a connected shape as a square shape on a cross-section of the first and third directions where the first internal electrode 121 of the multilayer electronic component 100 is not present. Accordingly, as the end portion where the first internal electrode 121 is connected to the first external electrode 131 may be wrapped around with the first-first buffer layer 11 and the first-second buffer layers 12, which are integrally connected, and the end portion where the second internal electrode 122 is connected to the second external electrode 132 may be wrapped around with the first-second buffer layer 12 and the second-second buffer layer 22 which are integrally connected, the effect of protecting the capacitance formation portion Ac from the penetration of external moisture can be more prominent.

The components of the first-first, first-second, second-first, and second-second buffer layers 11, 12, 21, and 22 are not particularly limited. However, it is preferable to include a conductive metal to be included in the external electrodes 131 and 132 to improve adhesion with the external electrodes 131 and 132, and it is also preferable to include a metal that forms an alloy with the conductive metal included in the external electrodes 131 and 132. For example, it may include at least one of Ni, Cu, Pt, Pd and alloys thereof.

When the average thickness of the first-first, first-second, second-first and second-second buffer layers 11, 12, 21, and 22 is less than 0.1 μm, the effect of improving the adhesion strength and improving the moisture resistance reliability may not be sufficient. When the average thickness of the first-first, first-second, second-first, and second-second buffer layers 11, 12, 21, and 22 exceeds 4 μm, the proportion of the cover portions 112 and 113 and of the margin portions 114 and 115 in the total components increases, making it difficult to improve the capacitance per unit volume of the multilayer electronic component 100. In an embodiment, the average thickness of the first-first, first-second, second-first and second-second buffer layers 11, 12, 21, and 22 is adjusted to be greater than 0.1 μm or 4 μm or less, thereby improving the adhesion strength and moisture resistance reliability at the same time.

The method of measuring the average thickness of the first-first, first-second, second-first and second-second buffer layers 11, 12, 21, and 22 is not particularly limited. For example, it may be an average value measuring the size of the first direction or the size of the third direction on cross-sections of the first direction or the third direction of the area where the second internal electrode 122 is not formed or the area where the first internal electrode is not formed, of the multilayer electronic component 100. The average thickness of the first-first, first-second, second-first and second-second buffer layers 11, 12, 21, and 22 can be further generalized by taking an average value measured at five equidistant interval points in the third direction or at five equidistant interval points in the first direction.

Figure 9A:
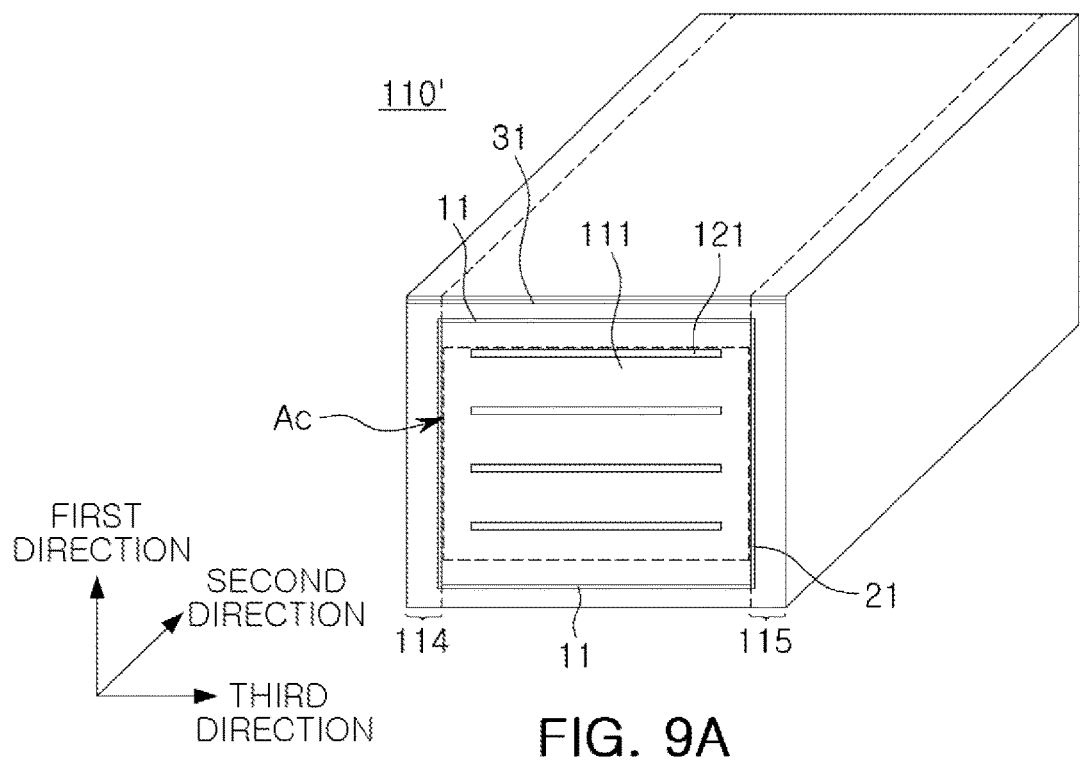
FIG. 9A is a perspective view schematically illustrating the body according to an embodiment of the present disclosure.
Figure 10A:
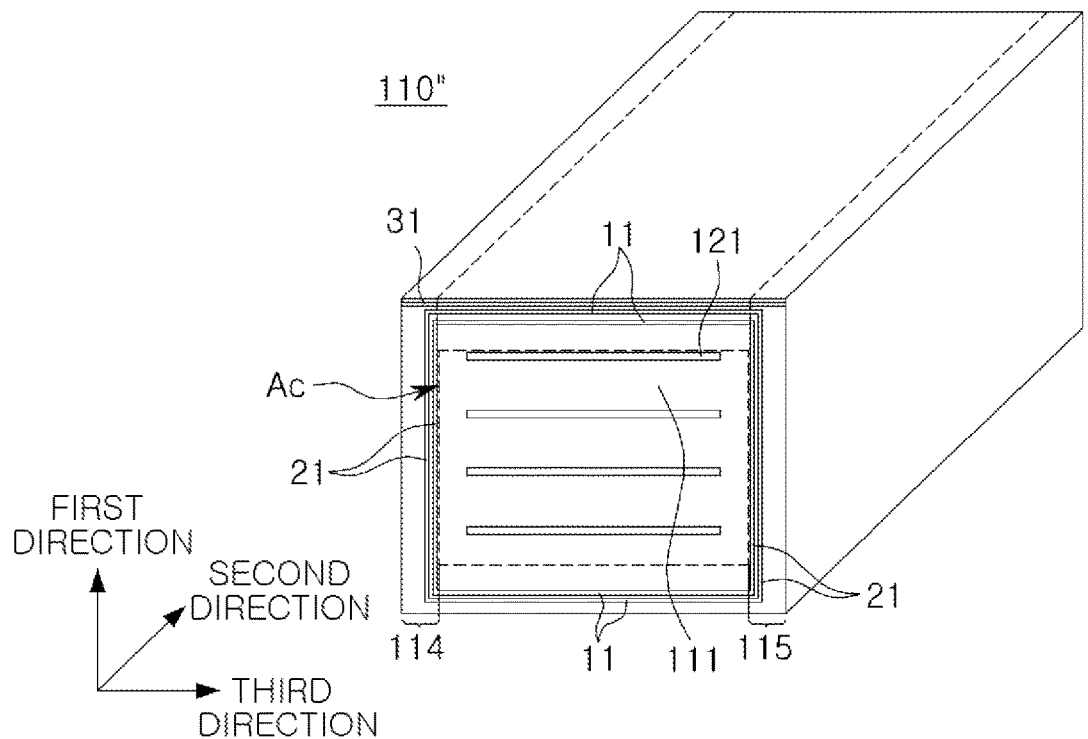
FIG. 10A is a perspective view schematically illustrating the body according to an embodiment of the present disclosure.
Figure 10B:
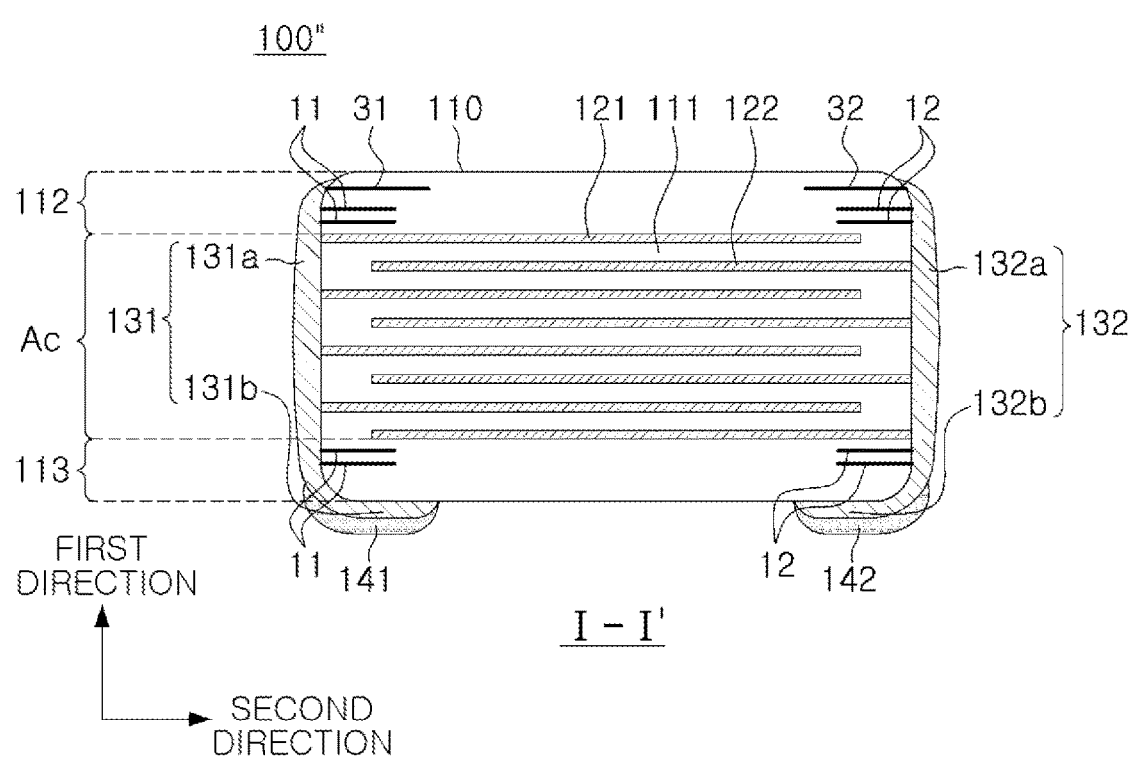
FIG. 10B is a cross-sectional view of the first and the second direction of the multilayer electronic component cut from a center part of the third direction according to an embodiment of the present disclosure.

FIG. 9A is a perspective view schematically illustrating a body 110' according to an embodiment of the present disclosure, and FIG. 10B is a cross-sectional view of the first direction and the second direction of a multilayer electronic component 100' cut from the center point of the third direction according to an embodiment of the present disclosure.

Figure 9B:
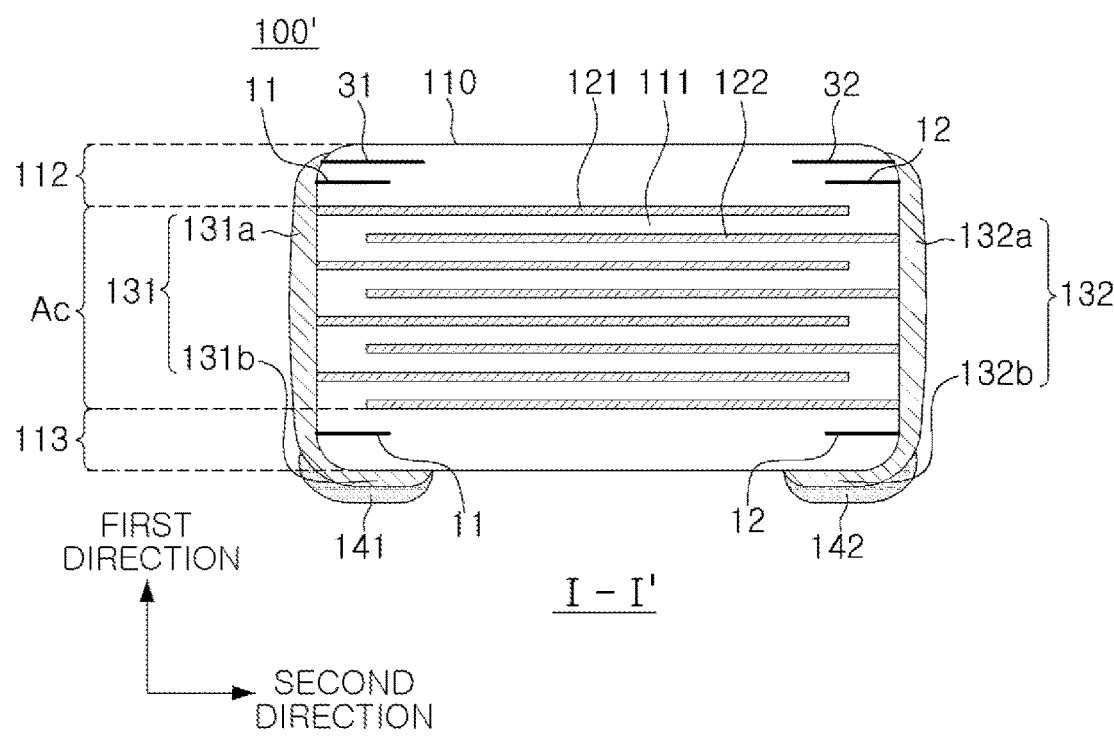
FIG. 9B is a cross-sectional view of a first and a second direction of the multilayer electronic component cut from a center part of a third direction according to an embodiment of the present disclosure.

Referring to FIGS. 9A and 9B, in the case of multilayer electronic components 100' according to an embodiment of the present disclosure, it comprises connection portions 131*a* and 132*a* in which the external electrodes 131 and 132 are disposed on the third and fourth surfaces 3 and 4 and band portions 131*b* and 132*b* disposed to extend from the connection portions 131*a* and 132*a* to a portion of the first surface 1. On the other hand, in the case of a structure in which the external electrodes 131 and 132 are not disposed on the second surface 2 according to an embodiment, there may be problem that the closer the first surface 1 of the body 110' is to the second surface 2, the more vulnerable it is to external moisture infiltration.

In the body 110' of the multilayer electronic component 100' according to an embodiment of the present disclosure, the cover portion 112 disposed on a surface of the first direction of the capacitance formation portion Ac may further include a third-first buffer layer 31 and a 3-2 (third-second) buffer layer 32 disposed separately in the first direction from the first-first buffer layer 11 and the first-second buffer layer 12. Accordingly, by forming the third-first and 3-2 (third-second) buffer layers 31 and 32 in the area of the cover portion 112 adjacent to the first surface of the body 110', which is relatively more vulnerable to external moisture infiltration, the moisture resistance reliability of the multilayer electronic component 100 can be significantly improved. The third-first buffer layer 31 may be disposed adjacent to the first-first buffer layer 11, and the 3-2 (third-second) buffer layers 32 may be disposed adjacent to the first-second buffer layer 12. The third-first buffer layer may extend along the second direction beyond the first-first buffer layer and toward the center of the cover portion. The third-first buffer layer may be disposed between the first-first buffer layer and the second surface. In addition, by not forming the third-first and 3-2 (third-second) buffer layers 31 and 32 in the cover portion 113 disposed on the other surface of the first direction of the capacitance formation portion Ac, the decrease of the capacitance per unit volume of the capacitance formation portion Ac can be minimized, so that the capacitance per unit volume of the multilayer electronic component 100' can also be sufficiently secured. In a similar aspect, in an embodiment, the average thickness of the first-first and first-second buffer layers 11 and 12 may be greater than the average thickness of the second-first and second-second buffer layers 21 and 22. Accordingly, as the thickness of the first-first buffer layer 11 and the first-second buffer layer 12 disposed in the cover portion 112 adjacent to the first surface of the body 110, which is relatively more vulnerable to external moisture infiltration, is thicker than the thickness of the second-first buffer layer 21 and the second-second buffer layer 22 disposed in the cover portion 113 adjacent to the second surface, the moisture resistance reliability of the multilayer electronic component 100 is improved and the capacitance per unit volume can also be sufficiently secured as well.

FIG. 10A is a perspective view schematically illustrating a body 110" according to an embodiment of the present disclosure, and FIG. 10B is a cross-sectional view of a multilayer electronic component 100" cut from the center point of the third direction according to an embodiment of the present disclosure.

Referring to FIGS. 10A and 10B, in the body 110" of the multilayer electronic component 100" according to an embodiment of the present disclosure, the number of layers of the first-first, first-second, second-first, and second-second buffer layers 11, 12, 21, and 22 may be greater than 1 and less than 3. When the number of layers of the first-first, first-second, second-first and second-second buffer layers 11, 12, 21, and 22 is less than 1, the moisture resistance reliability of the multilayer electronic component 100" cannot be improved. Therefore, in order to improve the moisture resistance reliability, it is preferable to improve the stacking number of the first-first, first-second, second-first and second-second buffer layers 11, 12, 21, and 22. However, when the stacking number of the first-first, first-second, second-first, and second-second buffer layers 11, 12, 21, and 22 exceeds 3, the proportion of the first-first, first-second, second-first, and second-second buffer layers 11, 12, 21, and 22 increases in the proportion of the total components, as the proportion of the capacitance formation portion Ac is not sufficiently secured, it may cause a problem in that the capacitance per unit volume of the multilayer electronic component 100" is not sufficiently secured. Therefore, by adjusting the stacking number of the first-first, first-second, second-first, and second-second buffer layers 11, 12, 21, and 22 to 1 to 3 or less, the moisture resistance reliability of the multilayer electronic component 100" can be improved while sufficient capacitance per unit volume can be secured. On the other hand, according to an embodiment, the third-first and 3-2 (third-second) buffer layers 31 and 32 may not be totally necessary in the multilayer electronic component 100", and they may not be included according to the number of layers of the first-first, first-second, second-first and second-second buffer layers 11, 12, 21, and 22.

On the other hand, the external electrodes 131 and 132 may be formed using any material having electrical conductivity such as metal, and a specific material may be determined in consideration of electrical characteristics and structural stability, and it may further have a multilayer structure. The external electrodes 131 and 132 according to an embodiment of the present disclosure include connection portions 131a and 132a and band portions 131b and 132b. The connection portions 131a and 132a and the band portions 131b and 132b may be formed by sintering including conductive metals and glass, or may be in a form of sintering electrodes or resin-based electrodes sequentially formed on the body. In addition, electrode layers may be formed in a manner of transferring a sheet including a conductive metal on the body or by transferring a sheet including a conductive metal on a sintering electrode.

The connection portions 131a and 132a and the band portions 131b and 132b are not particularly limited, and materials having excellent electrical conductivity may be used. For example, the conductive metal may be at least one of Ni, Cu, Pt, Pd and alloys thereof.

In an embodiment, plating layers 141 and 142 may be disposed on the band portions 131b and 132b, and specifically, the first plating layer 141 may be disposed on the first band portion 131b, and the second plating layer 142 may be disposed on the second band portion 132b. The plating layers 141 and 142 serve to improve the mounting characteristics. The types of plating layers 141 and 142 are not particularly limited and may be plating layers 141 and 142 comprising one or more of Ni, Sn, Pd and alloys thereof, and may be formed of a plurality of layers.

For a more specific example of the plating layers 141 and 142, the plating layers 141 and 142 may be a Ni plating layer or an Sn plating layer, or may be the Ni plating layer and the Sn plating layer sequentially formed on electrode layers, or may be the Sn plating layer, the Ni plating layer and the Sn plating layer sequentially formed. In addition, the plating layers may include a plurality of Ni plating layers and/or a plurality of Sn plating layers.

Meanwhile, in an embodiment of the present disclosure, since the plating layers 141 and 142 are disposed in the band portions 131b and 132b, the plating layers 141 and 142 are formed in a minimum area to secure implementability.

Referring to FIGS. 8A and 8B, the internal electrodes 121 and 122 may include body portions 121a and 122a that directly contribute to capacitance formation and the lead portions 121b and 122b that secure connectivity with the external electrodes 131 and 132. That is, in an embodiment, the first internal electrode 121 includes the first body portion 121a and the first lead portion 121b disposed to extend in the second direction from the first body portion 121a, and the second internal electrode 122 includes the second body portion 122a and the second lead portion 122b disposed to extend in the second direction from the second body portion 122a, and the first lead portion 121b is connected to the first external electrode 131 and the second lead portion 122b may be connected to the second external electrode 132. In this case, the first and second body portions 121a and 122a are connected to a surface and another surface of the third direction of the capacitance formation portion Ac of the body 110 to maximize the overlapping area of the first internal electrode 121 and the second internal electrode 122 and therefore further improving the capacitance per unit volume of the multilayer electronic component.

In an embodiment, an insulating layer may be disposed on the first and second connection portions 131a and 132a. Specifically, a first insulating layer may be disposed on the first connection portion 131a, and a second insulating layer may be disposed on the second connection portion 132a. Since the first and second connection portions 131a and 132a are areas connected to the internal electrodes 121 and 122, they may be paths of moisture infiltration when plating solution infiltrates in the plating process or during actual use. In the present disclosure, since the insulating layers are disposed on the connection portions 131a and 132a, it is possible to prevent external moisture infiltration or infiltration of the plating solution. The insulating layers may be disposed to be in contact with the first and second plating layers 141 and 142. In this case, the insulating layers may be in a form that cover partially the ends of the first and second plating layers 141 and 142, or in a form that the first and second plating layers 141 and 142 partially covering the ends of the insulating layers. The insulating layers may be disposed on the second surface and extended to the first and second connection portions 131a and 132a. In addition, the insulating layers may be disposed to cover all of the second surface when the external electrodes 131 and 132 are not disposed on the second surface.

The insulating layers may include, but are not limited to, glass materials having excellent plating fluid resistance, for example, a glass material including Si, and may be composed of a material having sufficient strength to protect the multilayer electronic component 100 from tensile stress due to heat shrinkage. In addition, the insulating layers may comprise a single component or a plurality of components, and more preferably comprise as additives one or more of the selected elements, such as $TiO_2$, $BaTiO_3$, $Al_2O_3$, $SiO_2$, BaO and etc., to improve the bonding force with the body 110 or the external electrodes 131 and 132.

Methods for forming insulating layers may vary depending on the component and purpose. For example, after forming a coating film using a squeegee of the insulating paste, the external electrodes 131 and 132 are placed on the body 110 to sequentially immerse each cross-section, and then dried under a temperature of 150° C. In addition, it may be formed by sol-gel processing, chemical vapor deposition (CVD), atomic layer deposition (ALD), and etc., but is not limited thereto, and it can be formed by other methods that can form a thin and uniform insulating layer.

EMBODIMENTS

Table 1 below shows the evaluation of the moisture resistance reliability of comparative example and of embodiments.

In the comparative example, a buffer layer is not disposed in the cover portions and the margin portions, but except for the fact that the buffer layer is not disposed, it has substantially the same configuration as the body 110 and the external electrodes 131 and 132 according to an embodiment of the present disclosure.

In an embodiment, as in the multilayer electronic component 100 according to an embodiment of the present disclosure, the cover portions include a first-first buffer layer connected to a first external electrode and a first-second buffer layer connected to a second external electrode, the margin portions include a second-first buffer layer connected to the first external electrode and a second-second buffer layer connected to the second external electrode, and the first-first buffer layer and the second-second buffer layer are connected to each other, and the first-second buffer layer and the second-second buffer layer are connected to each other.

Specifically, in the case of the embodiment 1, the number of layers of the first-first, first-second, second-first, and second-second buffer layers is 1, in the case of the embodiment 2, the number of layers of the first-first, first-second, second-first, and second-second buffer layers is 2, and in the case of embodiment 3, the number of layers of the first-first, first-second, second-first, and second-second buffer layers corresponds to 3.

The evaluation of moisture resistance reliability was taken place to check whether a failure occurs in 800 samples to which voltage was applied at 85° C., with 85% relative moisture, in a voltage raising condition of 100 V/s for 48 hours. At this time, a sample that decreased by more than $10^1$ times from the initial insulation resistance (IR) value was judged to be defective.

TABLE 1

|  |  | Number of defective ones | | | |
|---|---|---|---|---|---|
|  |  | Comparative example | Embodiment 1 | Embodiment 2 | Embodiment 3 |
| Voltage application time (Hr) | 0 | 0 | 0 | 0 | 0 |
|  | 4 | 0 | 0 | 0 | 0 |
|  | 8 | 0 | 0 | 0 | 0 |
|  | 12 | 1 | 0 | 0 | 0 |
|  | 16 | 1 | 0 | 0 | 0 |
|  | 20 | 1 | 0 | 0 | 0 |
|  | 24 | 6 | 0 | 0 | 0 |
|  | 28 | 17 | 4 | 0 | 0 |
|  | 32 | 93 | 8 | 4 | 0 |
|  | 36 | 480 | 13 | 4 | 4 |
|  | 40 | 800 | 34 | 6 | 4 |
|  | 44 | 800 | 78 | 20 | 4 |
|  | 48 | 800 | 137 | 50 | 4 |

In the comparative example, some samples turned out to be defective after 12 hours since the voltage was applied, and in the case of the embodiment 1, after 28 hours, after 32 hours in the embodiment 2, and after 36 hours in the embodiment 3. In particular, in the comparative example, when the voltage application time was more than 40 hours, it can be confirmed that a failure occurred in all 800 samples.

Accordingly, in the case of the multilayer electronic component that comprises a structure comprising a first connection portion disposed on a third surface, a first external electrode including a first band portion disposed to extend from the first connection portion to a portion of the first surface, a second connection portion disposed on a fourth surface, and a second external electrode including a second band portion disposed to extend from the second connection portion to a portion of the first surface, in which the cover portions include a first-first buffer layer connected to the first external electrode and a first-second buffer layer connected to the second external electrode, and the margin portions include a second-first buffer layer connected to the first external electrode and a second-second buffer layer connected to the second external electrode, in which it has as structure that the first-first buffer layer and the second-second buffer layer are connected to each other and the first-second buffer layer and the second-second buffer layer are connected to each other, the moisture resistance reliability is significantly improved compared to the case of the comparative example in which the buffer layers are not included in the cover portions and the margin portions.

In addition, it can be confirmed that as the number of layers of the first-first, first-second, second-first, and second-second buffer layers increases, the effect of improving the moisture resistance reliability is further improved.

Although the embodiments of the present disclosure have been described in detail above, the present disclosure is not limited by the above-described embodiments and accompanied drawings, but it is intended to be limited by the appended claims. Therefore, various forms of substitution, modification and changes will be possible by skilled persons in the art within the scope of the technical spirit of the present disclosure described in the claims, and this will also be said to fall within the scope of the present disclosure.

The expression 'an embodiment' used in this description does not refer to the same embodiments, and is provided to emphasize and describe each different unique feature. However, the embodiments presented above do not exclude being implemented in combination with features of other embodiments. For example, even if a point described in an embodiment is not described in another embodiment, it may be understood as a description related to another embodiment, unless there is a description that is contrary or contradictory to the point in another embodiment.

The terms used in the present disclosure are used only to describe an embodiment and are not intended to limit the present disclosure. In this case, the singular expression includes the plural expression unless it is clearly meant differently in the context.

While example embodiments have been shown and described above, it will be apparent to those skilled in the art that modifications and variations could be made without departing from the scope of the present invention as defined by the appended claims.

What is claimed is:

1. A multilayer electronic component comprising:
   a body including:
      first and second surfaces opposing each other in a first direction,
      third and fourth surfaces connected to the first and second surfaces and opposing each other in a second direction,
      fifth and sixth surfaces connected to the first to fourth surfaces and opposing each other in a third direction,
      a capacitance formation portion in which a dielectric layer and an internal electrode are alternately disposed in the first direction,
      cover portions respectively including dielectric layers disposed on surfaces of the capacitance formation portion opposing each other in the first direction, and
      margin portions respectively including dielectric layers disposed on surfaces of the capacitance formation portion opposing each other in the third direction;
   a first external electrode including:
      a first connection portion disposed on the third surface, and a first band portion disposed to extend from the first connection portion to a portion of the first surface; and a second external electrode including:
a second connection portion disposed on the fourth surface, and
a second band portion disposed to extend from the second connection portion to a portion of the first surface, wherein:
the cover portions include:
a first-first buffer layer connected to the first external electrode, and
a first-second buffer layer connected to the second external electrode, the margin portions include:
a second-first buffer layer connected to the first external electrode, and
a second-second buffer layer connected to the second external electrode,
the first-first buffer layer and the second-first buffer layer are connected to each other,
the first-second buffer layer and the second-second buffer layer are connected to each other, and
portions of the dielectric layers in which the first-first buffer layer and the first-second buffer layer are disposed extend to an outermost surface of the body in the first direction, or portions of the dielectric layers in which the second-first buffer layer and the second-second buffer layer are disposed extend to an outermost surface of the body in the third direction.

2. The multilayer electronic component of claim 1, wherein an average thickness of the first-first, first-second, second-first, and second-second buffer layers is greater than 0.1 µm and less than 4 µm, respectively.

3. The multilayer electronic component of claim 1, wherein a number of stacked layers of the first-first, first-second, second-first, and second-second buffer layers is greater than 1 and less than 3, respectively.

4. The multilayer electronic component of claim 1, wherein at least one of the cover portions further includes:
a third-first buffer layer spaced apart from the first-first buffer layer in the first direction, and
a third-second buffer layer spaced apart from the first-second buffer layer in the first direction.

5. The multilayer electronic component of claim 4, wherein the third-first buffer layer extends along the second direction beyond the first-first buffer layer and toward the center of the cover portion.

6. The multilayer electronic component of claim 4, wherein the third-first buffer layer is disposed between the first-first buffer layer and the second surface.

7. The multilayer electronic component of claim 6, wherein the first and second external electrodes are not disposed on the second surface.

8. The multilayer electronic component of claim 4, wherein only one of the cover portions includes the third-first buffer layer and the third-second buffer layer.

9. The multilayer electronic component of claim 1, wherein an average thickness of the first-first and first-second buffer layers is greater than an average thickness of the second-first and second-second buffer layers.

10. The multilayer electronic component of claim 1, wherein the first-first, first-second, second-first, and second-second buffer layers include at least one of Ni, Cu, Pt, Pd, and alloys thereof.

11. The multilayer electronic component of claim 10, wherein the first-first, first-second, second-first, and second-second buffer layers further include glass.

12. The multilayer electronic component of claim 1, wherein:
the first external electrode further includes a first plating layer disposed on the first band portion, and
the second first external electrode further includes a second plating layer disposed on the second band portion.

13. The multilayer electronic component of claim 12, wherein the first plating layer and the second plating layer include Sn.

14. The multilayer electronic component of claim 1, wherein:
the internal electrode includes a first internal electrode and a second internal electrode,
the first internal electrode includes:
a first body portion, and
a first lead portion disposed to extend from the first body portion in the second direction, the first lead portion is connected to the first external electrode, and
the second internal electrode includes:
a second body portion, and
a second lead portion disposed to extend from the second body portion in the second direction, the second lead portion is connected to the second external electrode.

15. The multilayer electronic component of claim 14, wherein the first body portion and the second body portion are connected to surfaces of the capacitance formation portion opposing each other in the third direction.

16. The multilayer electronic component of claim 1, wherein:
ends of the first-first and second-first buffer layers in the second direction are connected to the third surface, and
ends of the first-second and second-second buffer layers the second direction are connected to the fourth surface.

17. The multilayer electronic component of claim 1, further comprising:
a first insulating layer disposed on the first connection portion, and
a second insulating layer disposed on the second connection portion.

18. The multilayer electronic component of claim 17, wherein the first insulating layer and the second insulating layer comprise Si.

* * * * *